G. L. FORMAN.
HARNESS BRIDLE.
APPLICATION FILED FEB. 10, 1910.
1,073,973.
Patented Sept. 23, 1913.
2 SHEETS—SHEET 1.
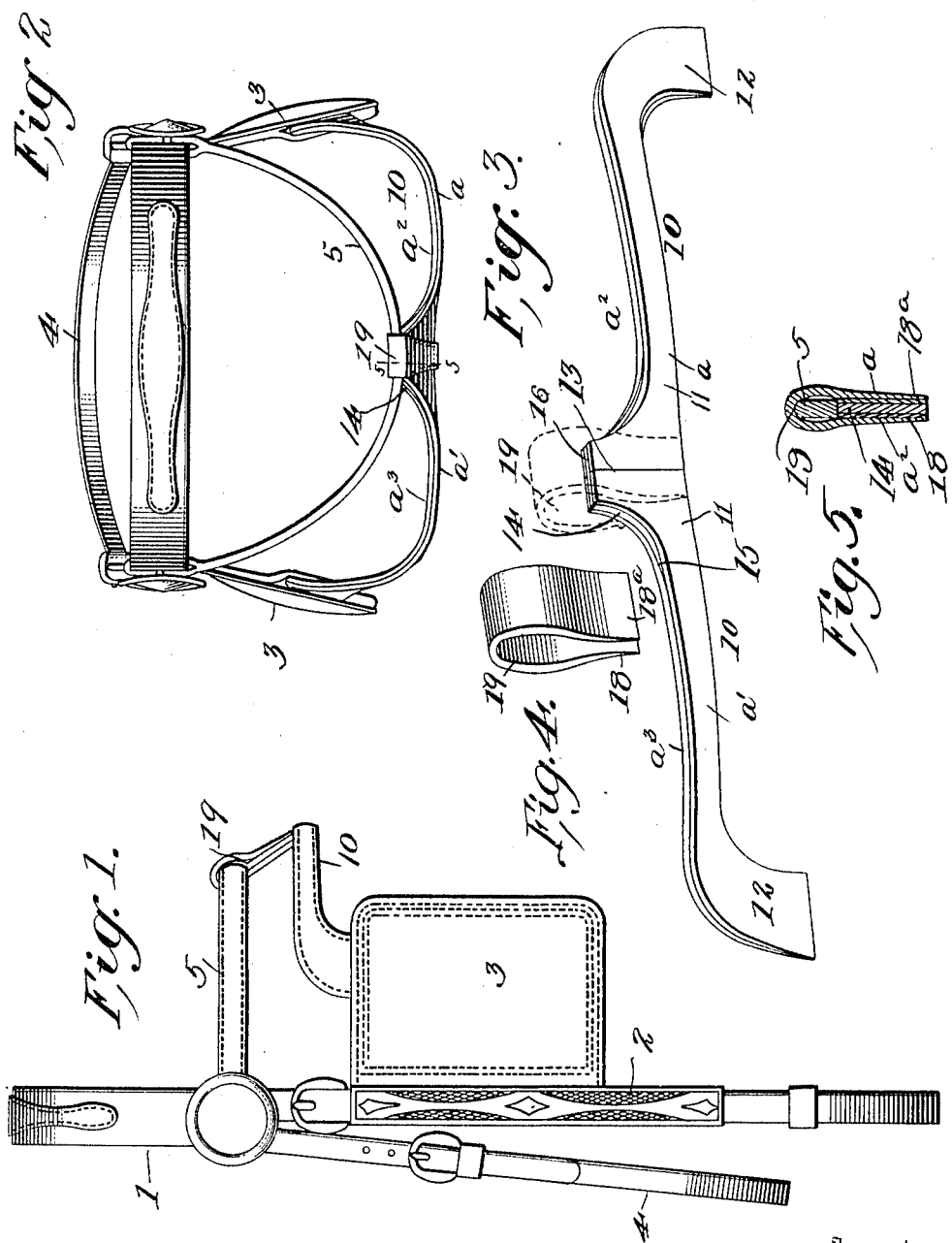
Witnesses
Jo. F. Collins
Rex Frye.
Inventor
George L. Forman
By C. J. Stockman
Attorney

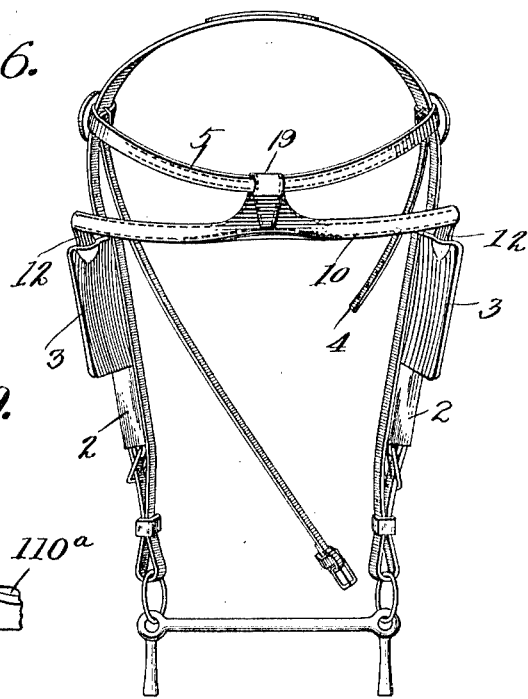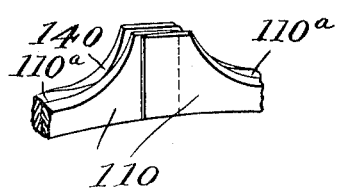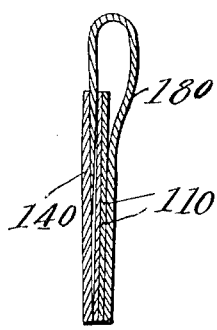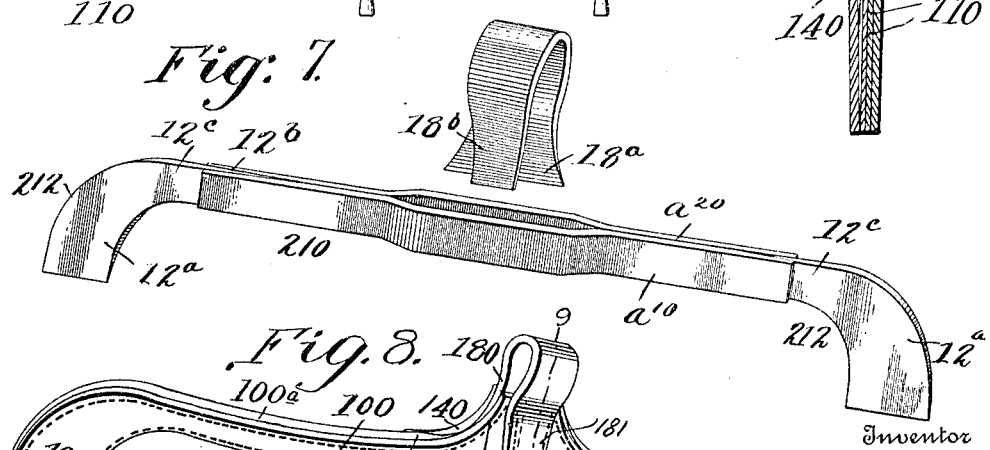

UNITED STATES PATENT OFFICE.

GEORGE L. FORMAN, OF LOUISVILLE, KENTUCKY.

HARNESS-BRIDLE.

1,073,973.
Specification of Letters Patent.
Patented Sept. 23, 1913.

Application filed February 10, 1910. Serial No. 543,175.

*To all whom it may concern:*

Be it known that I, GEORGE L. FORMAN, a citizen of the United States, residing at Louisville, in the county of Jefferson and State of Kentucky, have invented new and useful Improvements in Harness-Bridles, of which the following is a specification.

This invention relates to certain improvements in harness bridles and has for its particular purpose the provision of a simple and inexpensive bridle wherein the winkers or blinds are positively and effectively held from the eyes of the animal at all times. This purpose is accomplished according to the present invention by the coöperative action of a brace which extends across the brow of the animal and has rearwardly and inwardly bent ends attached to the winkers or blinds, and at its center is provided with a loop or eye which rises therefrom, and a front which extends through the loop or eye and is so related to the brace that it will pull the body of the latter in toward the center of the brow and transmit through said body to said ends a strain which effectively holds the ends in their rearwardly and inwardly bent position, wherein they force the outer or front ends of the winkers or blinds outward, away from the head of the animal.

The object is further accomplished by certain details in the construction of parts, as will be hereinafter seen.

In the accompanying drawings I have exemplified the present invention with various detail constructions of braces, and I shall describe these constructions of braces with particularity, but it is to be understood that the exemplified forms are merely illustrative of some of many various constructions which may be made within the spirit of the invention and the scope of the claims, and that I do not restrict myself to the detail forms illustrated and particularly described but reserve the right to change the same in many and apparently widely different respects, within the spirit of the invention and the scope of the claims.

In these drawings Figure 1 is a side elevation of a bridle, with my preferred form of winker brace. Fig. 2 is a plan view of the same. Fig. 3 is a perspective view of the preferred form of winker brace, showing the loop in dotted outline to disclose the connection of the brace-members with each other. Fig. 4 is a detail perspective view of the loop. Fig. 5 is a vertical section on the line 5—5 of Fig. 2. Fig. 6 is a front view of the bridle provided with my improved winker bracing means. Fig. 7 is a detail perspective view of a modified form of brace, with parts separated. Fig. 8 is a perspective view of part of still another modified form of brace. Fig. 9 is a vertical section on the line 9—9 of Fig. 8, and Fig. 10 is a detail part of the same brace.

The same characters of reference designate the same parts in the several views.

The crown 1, cheek-pieces 2, winkers or blinds 3, and throat-latch 4 need not differ in any particular from these several parts of head stalls or bridles as now employed. Similarly the brow-band or front-piece 5 may be of ordinary form but it bears a definite relation to the winker-brace in order that it may coöperate with the latter in the performance of its function in the present invention, as will be hereinafter fully explained.

The preferred form of winker brace is composed of a plurality of members $a$, $a^1$, $a^2$, $a^3$, each cut to a shape which comprises a body 10 having integral widened ends 11 and 12 extending in opposite directions from the plane of the body. The strip $a$ is superimposed on the strip $a^2$ and the strip $a^1$ is superimposed on the strip $a^3$, and the strips $a$ and $a^1$, and also the strips $a^2$ and $a^3$, are arranged with the edges of their portions 11 abutting each other as shown by the line 13, and said portions 11 of the strips $a$ and $a^1$ are separated from the similar portions of the strips $a^2$ and $a^3$ by a filling piece 14 having thinned lower ends as shown at 15. This forms a brace of double thickness, the parts of which may be cut to shape, whereby the disadvantages incident to bending the brace to its shape while wet, are overcome. It will be understood of course that the strips are suitably stitched together and it will be noted that the described form of the members of the brace provides at the center of the brace an upwardly projecting extension of definite thickness and length which presents a substantial bearing surface 16 for the lower edge of the brow-band 5, this bearing being composed of the plane ends of the parts 11 and filling piece 14. It will also be noted that the sides of said parts 11 are curved and merge into the upper surface of the bodies 10, and that the inner and outer edges of the parts 12 are curved on lines of different radii and merge into the upper and lower edges of said bodies. These parts 12 are also thinned toward their free ends as shown.

A loop formed of leather or other suitable flexible material, bent to shape, has its ends 18 and 18$^a$ arranged over the junction of the parts 11 and stitched or otherwise secured to said parts, as indicated in dotted outline in Fig. 3. The material of which this loop is formed is of such length as to provide an eye 19 above the shoulder or bearing 16 through which the front or browband 5 loosely extends and by which the latter is connected to the brace.

In practice the brace extends around the brow of the animal with its ends 12 arranged rearward of its body or limbs and inclined toward each other corresponding to the outward inclination which they are intended to give the winkers or blinds. When cut to shape they maintain their form even after they have been wet, and hence correct to a very large extent the tendency of the winkers or blinds to flop back and forth. It is important, however, that the center of the brace be drawn in toward the brow, in order that its tendency to protrude at this point may be corrected, and this tendency is corrected according to the present invention by the brow band 5, which is shown as extending through the loop and making said band of such length with relation to the length of the brace as to draw the latter in at its center to the brow of the animal and force the ends 12 inclinatorily outward, so as effectively to hold the winkers or blinds away from the eyes of the animal. The upwardly projecting central portion of the brace is highly desirable for the reason that it provides a predetermined space between the bodies of the front or brow-band and the brace, affording a perfect fit without any tension on either the brace or the brow-band, and the bearing which supports the browband in the loop acts as a stop to movement of the brow-band upon the stitches, thus contributing to the durability of the bridle.

In the form shown in Figs. 8, 9 and 10, the filling piece 14 is omitted; the contiguous ends (110) of the front strips or members (designated 100) are thinned and overlap each other; the rear strips or members (marked 100$^a$) have their ends 110$^a$ spaced apart and thinned; the loop has its rear limb or member, 180, disposed between and in contact with the ends 110$^a$ of the rear members, and also in contact with the rear surfaces of the ends 110 of the front members, while its front limb or member 181 rests against the front faces of the ends 110 at the junction of the latter; and a separate piece or strip (140) is disposed rearward of the end 180 of the loop and over the junction of the parts. This strip 140 is provided with a central raised portion and laterally projecting limbs so as to conform to the shape of the members 100 at the junction of the latter, its limbs however being comparatively short and being thinned and conforming to the thinned ends 110$^a$ of the rear members, against which said limbs are arranged. The several parts referred to are stitched, or otherwise suitably secured together.

It is not wholly essential that the ends 12 or 120 of the brace be integral with the bodies 10 or 100 thereof or that two separately-formed limbs be employed, it being within the purview of the invention in its broader aspects to form such ends separate from the body parts and of form adapted to be secured to the winkers or blinds, and to form the body part of a continuous piece extending from one of said ends to the other. A form of such brace is exemplified in Fig. 7, wherein a body-part, marked 210, is provided with ends, 212, of separate formation, the body extending between the ends and connecting the latter with each other. Each end comprises parts 12$^a$ and 12$^b$ arranged at an angle with each other, and of different widths. The parts 12$^a$ are intended for attachment to the winkers or blinds and the parts 12$^b$ are secured to the ends of the body 210. In use, the end portions 212 are bent, suitably adjacent to the place of their connection to the bodies, at 12$^c$ for example.

In the form shown in Fig. 7, the body 210 is made in two layers, $a^{10}$ and $a^{20}$, between the ends of which the portions 12$^b$ of the parts 212 are inserted, and these two layers are stitched together except at a place about midway the length thereof, where they are left free to form a pocket or space for the end 18$^a$ of a flexible strip, which is stitched or otherwise suitably secured in said pocket or space and which strip is of length adapting it to form a loop arranged above the body of the brace for the reception of the brow-band or front-piece 5 as aforesaid. The end 18$^b$ of said piece, after the browband has been inserted through the loop or eye, is stitched or otherwise suitably secured to the body of the brace. It is apparent that the layers $a^{10}$ and $a^{20}$, either or both, may be widened at their longitudinal centers, or elsewhere in their length to provide a space between the brow-band and the body of the brace and also, if desired, a bearing for the brow-band, protecting the stitches against wear.

From the foregoing the construction, operation and advantages of my invention will be understood, and it will be seen that the invention may be embodied in various different detail constructions, some of which have been illustrated, without departing from the spirit thereof or the scope of the subjoined claims.

Having now described my invention what I believe to be new and desire to secure by Letters Patent, is:—

1. In a bridle, the combination with winkers and a brace having ends which are secured to the winkers, of a brow band and connections between the brow band and the center of the brace, the relative lengths of the brow band and brace being such that the brow band will pull the center of the brace in toward the brow of the animal and throw the ends out.

2. A winker brace having a flexible body, provided with laterally projecting ends to engage the winkers and a widened portion between its ends, said widened portion having a squared upper end, a loop connected to the body in proximity to the widened portion thereof, and a brow band which extends through the loop and bears upon the squared upper end of the body, the brow band and brace being of relative lengths such that the brow band will pull the center of the brace in toward the brow of the animal and throw the ends out.

3. A winker brace having a flexible body and ends which are wider than the body and bent abruptly from the plane thereof and which extend rearward of the body and inclinatorily toward each other, said body curving longitudinally from each end to its center with its center rearward of the plane of the contiguous parts, a loop at said center arranged above the edge of the brace, and a brow band which extends through said loop and holds the parts of the brace in the position stated.

4. A winker brace comprising a plurality of parts each having an end portion arranged at an angle with its remaining portion and of greater width than the same and adapted to be secured to a winker, means for connecting said parts with each other, a brow band above the connecting means, and a loop encircling the brow band and connecting the same with said connecting means, said brow band being of such length that it will pull the center of the brace in toward the brow of the animal and throw the ends out.

5. A winker brace comprising a plurality of members each having a flexible body provided with ends projecting laterally in opposite directions therefrom, two of said ends adapted to be secured to winkers and the other two arranged in proximity to each other, a flexible strip secured to the brace in proximity to the latter ends, said strip being bent to form an eye or loop, and a brow band which extends through the loop or eye and is adapted to bend the brace inward at the center and throw the first mentioned ends outward.

6. A winker brace comprising superimposed flat members secured together and provided with widened ends which project laterally therefrom, a loop secured to the brace at the center of the latter, and a brow band which extends through the loop and is adapted to pull the center of the brace in toward the brow of the animal and throw the ends thereof outward.

7. A winker brace composed of superimposed flat members at each side of the longitudinal center thereof, each of said members having a flexible body provided with ends projecting laterally in opposite directions therefrom, said members relatively so arranged that one laterally projecting end of each of the same will be in proximity to each other and at the center of the brace, the other ends thereof being adapted for attachment to the winkers, a strip having its ends secured to the brace in proximity to the junction of the first-mentioned ends, said strip bent to form a loop or eye above said junction, and a brow band which extends through the loop or eye and is adapted to bend the brace inward at said junction and throw the winker ends of the brace outward.

8. A winker brace composed of superimposed pairs of flat members at each side of the longitudinal center thereof, each of said members having a flexible body provided with ends projecting laterally in opposite directions therefrom, said members relatively so arranged that one laterally projecting end of each of the same will be in proximity to each other at the center of the brace, the other ends thereof being adapted for attachment to the winkers, a strip having its ends secured to the brace and arranged upon the front and rear surfaces of the latter respectively and over the junction of the first-mentioned ends, said strip forming a loop or eye above the edge of the ends of said junction, and a brow band which extends through the loop or eye and is adapted to bend the brace inward at said junction and throw the winker ends of the brace outward.

In testimony whereof I have hereunto set my hand in presence of two subscribing witnesses.

GEORGE L. FORMAN.

Witnesses:
RAY M. McGRATH,
HERMAN FORTWINGLER.